(12) United States Patent
Togami

(10) Patent No.: US 8,208,820 B2
(45) Date of Patent: Jun. 26, 2012

(54) IMAGE FORMING APPARATUS

(75) Inventor: Atsushi Togami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1147 days.

(21) Appl. No.: 12/041,887

(22) Filed: Mar. 4, 2008

(65) Prior Publication Data

US 2008/0226310 A1    Sep. 18, 2008

(30) Foreign Application Priority Data

Mar. 15, 2007    (JP) ................................. 2007-066511

(51) Int. Cl.
*G03G 15/08* (2006.01)
(52) U.S. Cl. ........................................................ 399/27
(58) Field of Classification Search ...................... 399/27
See application file for complete search history.

(56) References Cited

U.S. PATENT DOCUMENTS

| | | | |
|---|---|---|---|
| 6,868,238 B2 * | 3/2005 | Rodriguez ....................... | 399/27 |
| 6,895,193 B2 * | 5/2005 | Takamatsu et al. ............. | 399/27 |
| 2001/0021031 A1 | 9/2001 | Hashimoto et al. | |
| 2004/0042804 A1 * | 3/2004 | Yamamoto et al. ............. | 399/27 |
| 2006/0114502 A1 | 6/2006 | Kang et al. | |
| 2006/0204257 A1 | 9/2006 | Kawano et al. | |

FOREIGN PATENT DOCUMENTS

| | | |
|---|---|---|
| JP | 10-319789 | 12/1998 |
| JP | 2002-278249 | 9/2002 |
| JP | 2002-296983 | 10/2002 |
| JP | 2005-277747 | 10/2005 |
| JP | 2006-243492 | 9/2006 |
| JP | 2006-308854 | 11/2006 |

OTHER PUBLICATIONS

Jul. 30, 2010 European search report in connection with counterpart European patent application No. 08250917.
Japanese official action dated Dec. 22, 2011 in a corresponding Japanese patent application.

* cited by examiner

*Primary Examiner* — David Gray
*Assistant Examiner* — Erika J Villaluna
(74) *Attorney, Agent, or Firm* — Cooper & Dunham LLP

(57) ABSTRACT

An image forming apparatus includes a data processor, a first calculating unit, a second calculating unit, an updating unit, and an instructing unit. The first calculating unit calculates estimated developer consumption necessary to form an image. The second calculating unit calculates developer consumption corresponding to a sum of density values of image pixels. The updating unit calculates remaining developer. The instructing unit issues an instruction to the data processor to reduce developer to be consumed when the estimated developer consumption exceeds the remaining developer. The data processor converts scanned image data into print image data in response to the instruction such that the image is to be formed with the remaining developer.

18 Claims, 15 Drawing Sheets

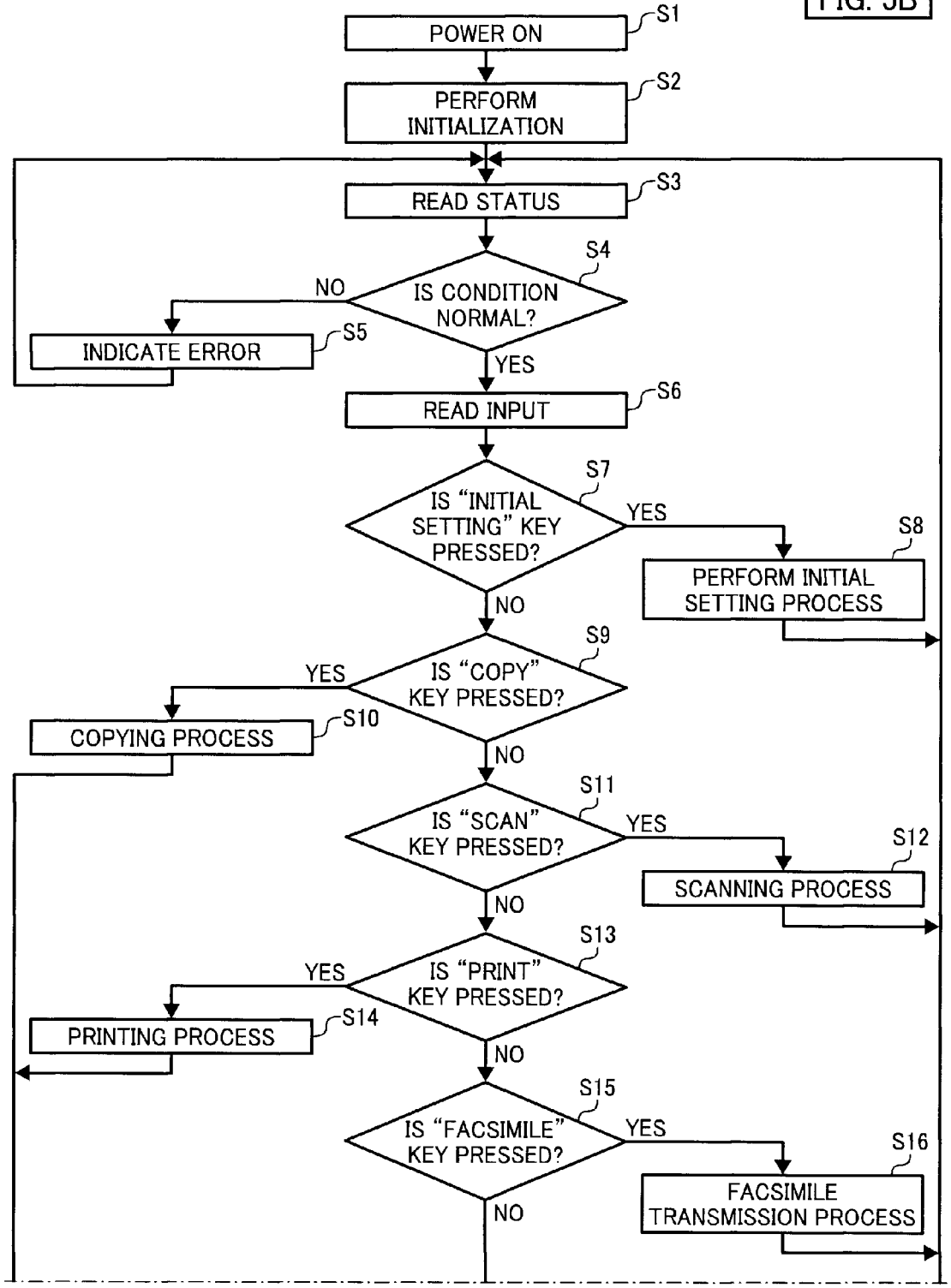

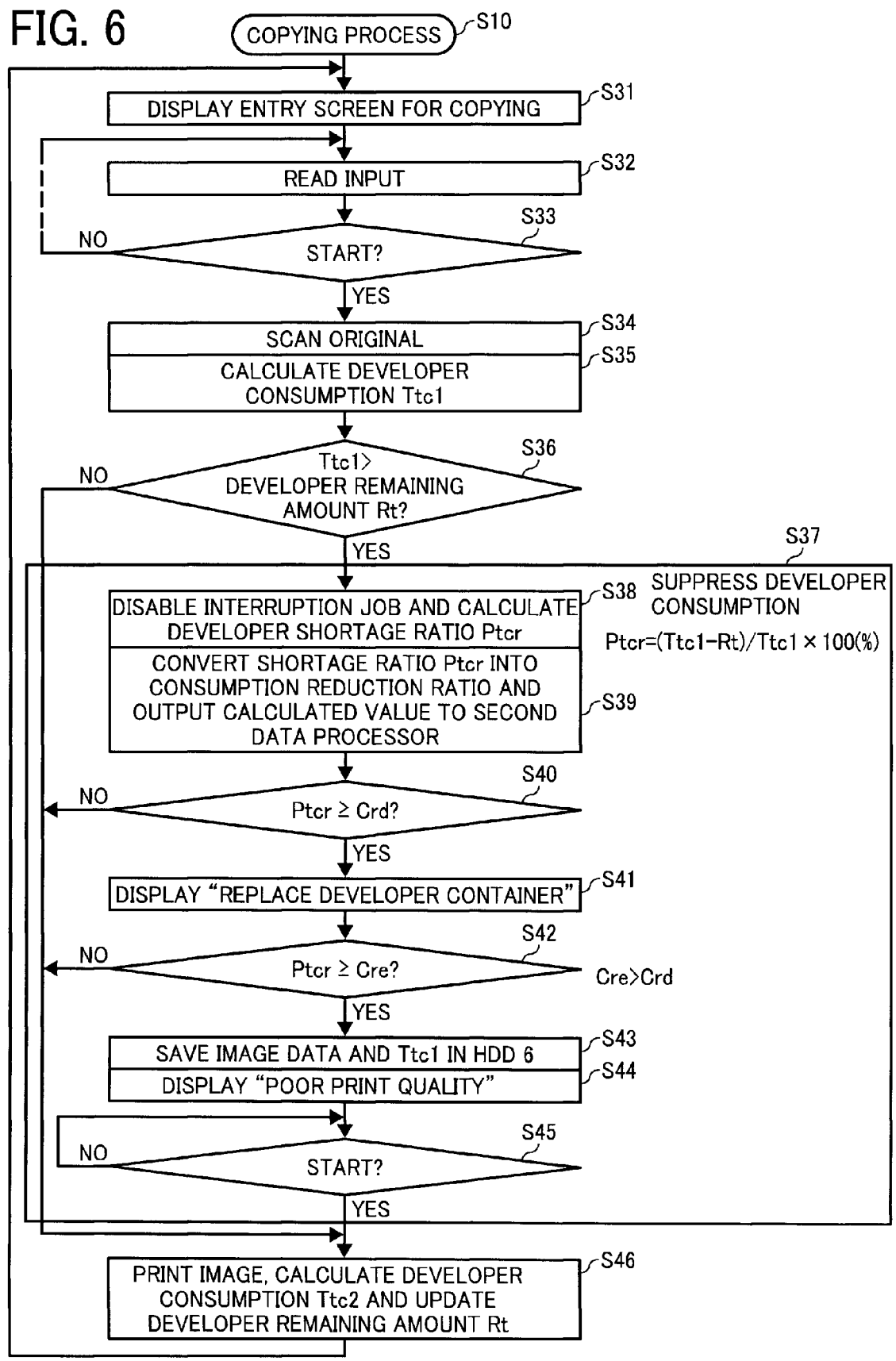

IMAGE FORMING APPARATUS

CROSS-REFERENCE TO RELATED APPLICATIONS

The present application claims priority to and incorporates by reference the entire contents of Japanese priority document, 2007-066511 filed in Japan on Mar. 15, 2007.

BACKGROUND

1. Technical Field

This disclosure relates to an image forming apparatus.

2. Description of the Related Art

Image forming apparatuses form an image using developer such as toner or ink. An amount of remaining developer is detected with a sensor or estimated by, for example, counting the number of image forming jobs or calculating a total number of recorded pixels of image data used in image forming, or a combination thereof. When remaining developer becomes low, a display unit indicates that a bottle or a container of the developer needs replacement. When the developer remaining amount drops to zero, the image forming apparatus does not perform image forming in response to an instruction to form an image.

Japanese Patent Application Laid-open No. 2002-278249 discloses a conventional technology in which a toner consumption estimated by counting density values of pixels of an image to be formed. A toner remaining amount is updated to a value obtained by subtracting the toner consumption from an initial toner amount, which is an amount of toner in a newly-replaced toner cartridge.

Japanese Patent Application Laid-open No. 2006-243492 discloses a conventional technology having a plurality of image forming modes for suppressing developer consumption by correcting a density of image data, in which remaining service life of an image carrier is detected. The image density is controlled by adjusting a condition for an image forming process so that an amount of remaining developer becomes zero simultaneously with the service life of the image carrier expires.

Japanese Patent Application Laid-open No. H10-319789 discloses a conventional technology in which an image forming apparatus indicates that remaining toner is low on an operating panel when remaining toner becomes low. When a toner-saving mode is selected by a user, the image forming apparatus changes an output power of laser beam that forms a latent image or a bias current value of a primary charger, thereby decreasing image density.

Japanese Patent Application Laid-open No. 2005-277747 discloses a conventional technology in which a toner consumption is maintained constant over a predetermined period by estimating and adjusting a toner amount to be consumed for an image to be formed for leveling consumption cycles of a plurality of toner cartridges. For example, a density adjusting unit adjusts density values of pixels of image data to be printed so that a target value of toner is consumed in a predetermined period.

Japanese Patent Application Laid-open No. 2006-308854 discloses a conventional technology in which an estimated number of sheets required to print images of a current job is derived when a developer remaining amount decreases to a predetermined level. When the estimated number of sheets is greater than image-formable sheets, which is the number of sheets that can be printed with the remaining amount of the developer, a plurality of image forming modes is displayed each suppressing the developer consumption so that a user can select one of the image forming modes.

However, the conventional technology described in Japanese Patent Application Laid-open No. 2002-278249 is disadvantageous in that even when the toner becomes empty, the image forming apparatus prompts only replacement of a toner cartridge. Therefore, when image printing is attempted after issuance of an alarm, the toner can fall short during a course of printing, causing a print job thereof to be suspended and decreasing productivity. The conventional technology described in Japanese Patent Application Laid-open No. 2006-243492 is similarly disadvantageous in that toner can fall short during a course of image printing or a service life of a image carrier can expire, thereby causing a print job thereof to be suspended and decreasing productivity. The toner-saving mode described in Japanese Patent Application Laid-open No. H10-319789 allows to increase the number of image-formable sheets; however, toner can fall short during a course of a print job, resulting in suspension of the print job, which decreases productivity. The conventional technology described in Japanese Patent Application Laid-open No. 2005-277747 is similarly disadvantageous in that when a print job is carried out with a low level of remaining toner, it is likely that a toner cartridge needs to be replaced during a course of a print job. This can result in a decrease in productivity. Suspending a print job and causing downtime during urgent printing of a document can cause let business opportunities slip away. The conventional technology described in Japanese Patent Application Laid-open No. 2006-308854 is disadvantageous in that when image forming of a large number of images is started with the developer remaining amount higher than the predetermined level, the image forming mode that suppresses the developer consumption is not set in. Therefore, it is likely that the toner cartridge needs to be replaced during a course of an image forming job.

BRIEF SUMMARY

In an aspect of this disclosure, there is provided an image forming apparatus including a scanning unit that reads image data and outputs read image data; a data-processing unit that converts the read image data into print image data; an output unit that forms an image on a recording medium with developer based on the print image data, and outputs the image; a first calculating unit that calculates estimated developer consumption, which is an amount of developer that the output unit requires to complete forming an image corresponding to the read image data; a second calculating unit that calculates developer consumption, which is an amount of developer corresponding to a sum of density values of pixels of the image to be formed by the output unit based on the print image data; an updating unit that subtracts the developer consumption from a remaining developer amount in the output unit to update the remaining developer amount for each job, and retains the remaining developer amount; and an instructing unit that, when the estimated developer consumption exceeds the remaining developer amount upon forming of the image corresponding to the read image data, issues an instruction to the data-processing unit to reduce developer to be consumed to form the image to the remaining developer amount. The data-processing unit converts the read image data into the print image data in response to the instruction from the instructing unit such that the output unit forms the image with developer in the remaining developer amount.

The aforementioned and other aspects, features, advantages and technical and industrial significance will be better understood by reading the following detailed description of

BRIEF DESCRIPTION OF THE DRAWINGS

FIG. 4 is a plan view of reference images formed to be used by a filtering unit shown in FIG. 2 to correct MTF characteristics and the like;

FIG. 6 is a detailed flowchart of a copying process shown in FIG. 5;

DETAILED DESCRIPTION OF THE PREFERRED EMBODIMENTS

Exemplary embodiments to the present invention are explained in detail below with reference to the accompanying drawings.

Figure 1:
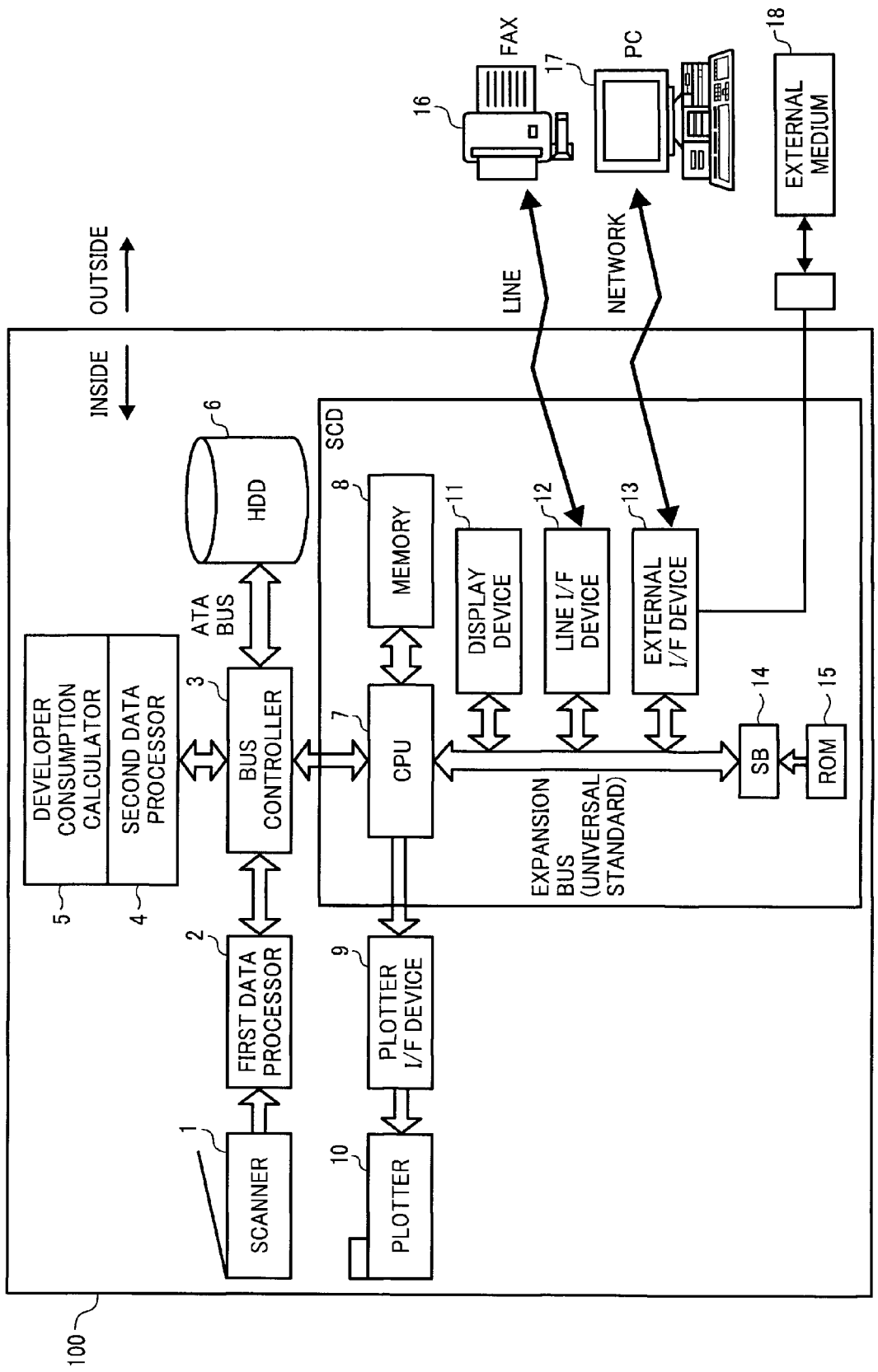
FIG. 1 is a block diagram of an image forming apparatus according to a first embodiment of the present invention.

FIG. 1 is a block diagram of a multifunction product (MFP) 100 as an image forming apparatus according to a first embodiment of the present invention. A scanner 1 has an analog-to-digital (A/D) converter, a line sensor formed with a charge coupled device (CCD) photoelectric conversion element, and driving circuits therefor. The scanner 1 scans an original to obtain grayscale data thereof, generates 8-bit, red, blue, and green (RGB) digital image data based on the grayscale data, and outputs the digital image data. A first data processor 2 standardizes the digital image data supplied from the scanner 1 so that the image data bears predetermined characteristics. The characteristics are standardized to allow a destination of image data to be changed when the image data are stored in the MFP 100 or output for reuse.

Figure 2:
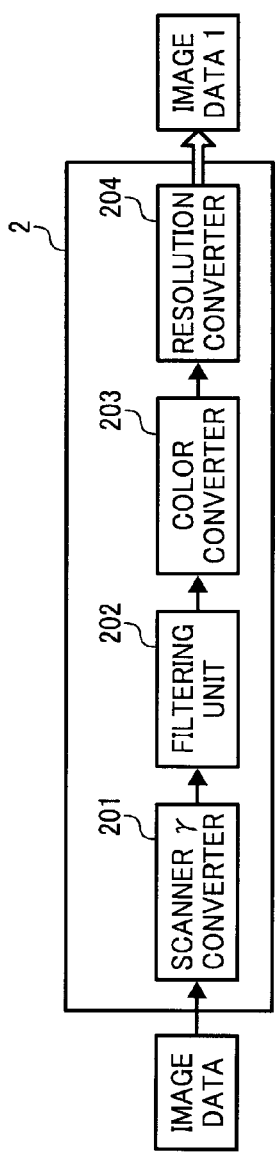
FIG. 2 is a functional block diagram of a first image processor shown in FIG. 1.
Figure 4:
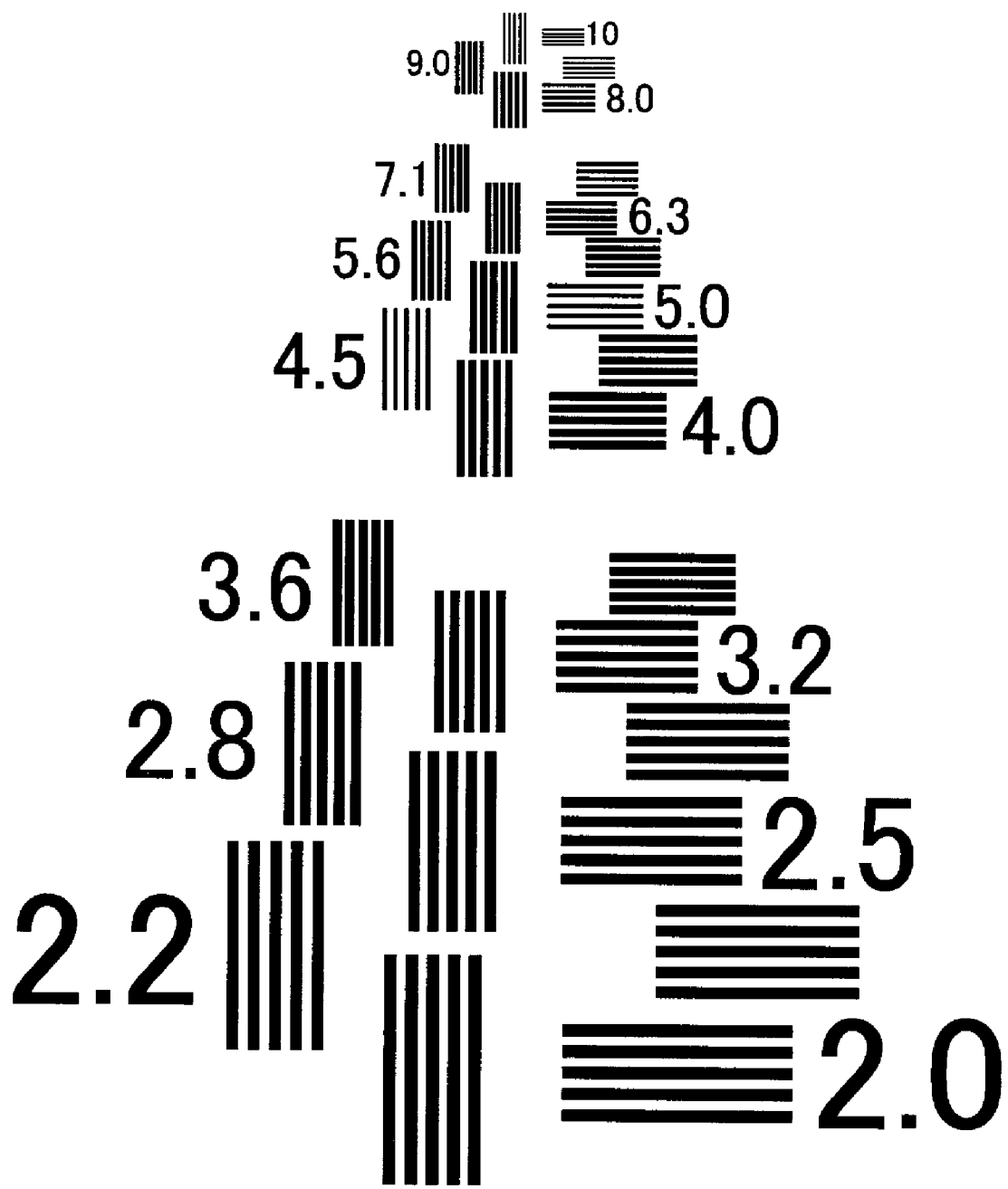

FIG. 2 is a functional block diagram of the first data processor 2. Image data entered and digitized by the scanner 1 is subjected to γ correction performed by a scanner γ converter 201. The scanner γ converter 201 corrects a characteristic of the image data based on a reflectivity to a predetermined value, e.g., converts a γ characteristic to bear a γ value of 2.2. Subsequently, a filtering unit 202 corrects modulation transfer function (MTF) characteristics and the like of the image data imparted by the scanner 1 to predetermined values. In the first embodiment, correction is performed so that a scanning result of reference chart patterns as shown in FIG. 4 bears a predetermined MTF value for each scanning line. A color converter 203 performs conversion from a color space according to the scanner 1 to a predetermined color space. The color space is preferably as large as possible to protect image data from being clipped or compressed. However, when the color space is excessively large, a problem of tone jump arises, and thus conversion to Adobe® RGB, which is one of standardized color spaces, is performed. A resolution converter 204 converts resolution of the image data read with the scanner 1 to a predetermined value. It is assumed herein that resolution is converted to 600 dots per inch (dpi); however, it can be converted to other values.

Referring back to FIG. 1, the image data with characteristics standardized by the first data processor 2 is sent to a bus controller 3. Upon receipt of the RGB image data from the first data processor 2, the bus controller 3 causes a central processing unit (CPU) 7 to store the RGB image data in a memory 8. The RGB image data loaded into the memory 8 can be stored in a hard disk drive (HDD) 6 for reuse as required. The RGB image data stored in the memory 8 is sent to a second data processor 4 via the CPU 7 and the bus controller 3.

The bus controller 3 is a controller of a data bus through which various types of data, such as image data and control commands, are exchanged, and also has a function of bridging between various types of bus standards. In the first embodiment, connection with each of the first data processor 2, the second data processor 4, a developer consumption calculator 5, and the CPU 7 is established via a PCI Express® bus and connection with the HDD 6 is established via an advanced technology attachment (ATA) bus, thus forming an application-specific integrated circuit (ASIC).

When digital image data is standardized to bear predetermined characteristics by the first data processor 2, or image data is entered via a line interface (I/F) device 12 or an external I/F device 13, the second data processor 4 performs adjustment and modification, such as developer consumption suppression. The second data processor 4 also performs image processing to cause the image data to conform to an output destination specified by a user.

The developer consumption calculator 5 estimates a developer consumption based on a final image having been processed by the second data processor 4 to conform to the output destination. The estimated value is read by the CPU 7. Incidentally, in the first embodiment, the MFP 100 is assumed to be of electrophotographic type that uses toner as developer, i.e., the developer is toner. However, the developer is ink in the case of, for example, an inkjet printer.

Figure 3:
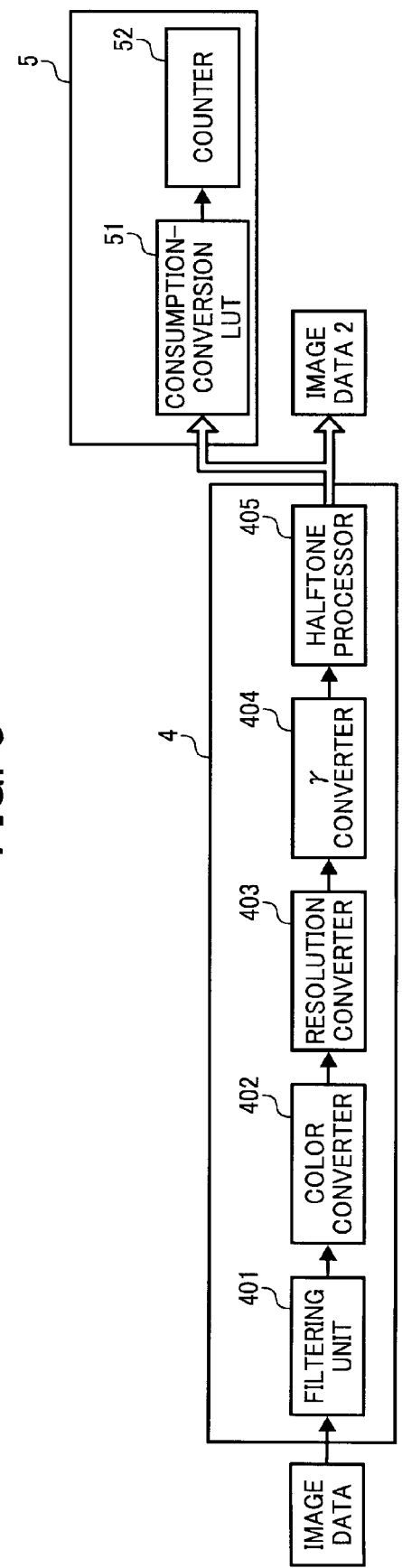
FIG. 3 is a functional block diagram of a second image processor shown in FIG. 1.

FIG. 3 is a functional block diagram of the second data processor 4 and the developer consumption calculator 5. A filtering unit 401 corrects sharpness and signal-to-noise ratio (S/N) of the RGB image data so that the RGB image data is improved in reproducibility when printed with a plotter 10 serving as a printer. More specifically, the filtering unit 401 sharpens and smoothes the image data according to information on a mode that specifies a desired image process. For example, in a character mode, the filtering unit 401 sharpens the image data to clarify and emphasize characters, whereas in a photo mode, the filtering unit 401 smoothes the image data to smoothly represent grayscale tones. Upon receipt of the 8-bit RGB image data, a color converter 402 converts the image data to 8-bit cyan, magenta, yellow, and black image data (hereinafter, "8-bit CMYK image data"), which is a color space for the plotter 10. Simultaneously with the conversion, color saturation is also adjusted according to the mode information specified by the user. Upon receipt of an instruction from the CPU 7 to suppress developer consumption, the color converter 402 regulates a total amount of the developer or increases brightness (brightens) in color conversion, thereby reducing a total consumption of the developer. A resolution converter 403 converts a resolution of the CMYK image data according to a performance of the plotter 10. In the first embodiment, because a resolution of the plotter 10 is 600 dpi, no conversion is performed. When the resolution converter 403 receives an instruction from the CPU 7 to suppress developer consumption, the entire image is reduced to suppress developer consumption. This reduction includes combining two pages into one page and thinning, which is simple thinning on a line-by-line basis. A γ converter 404 converts a γ value of the CMYK image data according to processing characteristics of the plotter 10. When the γ converter 404 receives an instruction from the CPU 7 to suppress developer consumption, the γ converter 404 performs γ conversion using a γ curve, which is set to decrease all color densities, thereby suppressing developer consumption. Upon receipt of the 8-bit CMYK data, a halftone processor 405 performs halftone processing according to a tone processing capacity of the plotter 10. In the first embodiment, an error diffusion method, which is one of digital halftoning methods, is used to convert the 8-bit image data into 2-bit CMYK data. After being subjected to the halftone processing, the 2-bit CMYK image data is output to the bus controller 3 and simultaneously sent to the developer consumption calculator 5.

The developer consumption calculator 5 estimates a developer consumption for each pixel based on the 2-bit CMYK image data by referring to a consumption-conversion lookup table (LUT) 51. A counter 52 accumulates the estimated consumptions on a page-by-page basis. The CPU 7 reads the calculated per-page consumptions and calculates a cumulative amount of the developer consumed for all the pages (all sheets) included in an image forming job as a developer consumption Ttc2. A developer remaining amount Rt is updated to a value calculated by subtracting the developer consumption Ttc2 from an initial developer amount, which is an amount of the developer in a newly-replaced developer container. The updated developer remaining amount Rt is retained in a nonvolatile storage. The CPU 7 also controls a total sheet count and a cumulative sum of the developer consumptions Ttc2 of all image forming jobs performed since the developer container is replaced to a new one. Based on these information pieces, the CPU 7 also calculates a per-page average developer consumption and retains the value in a nonvolatile storage.

The CPU 7 resets the developer remaining amount Rt, the total sheet count, and the developer consumption Ttc2, which are controlled by the CPU 7, to their initial values at a time of replacement of the developer container or when an explicit instruction for initialization is entered by a user, and resumes a control operation for a new developer container at a start of a subsequent output job. The initial developer amount is preferably automatically obtained via an electronic tag provided in a developer unit rather than set to a fixed value.

Referring back to FIG. 1, upon receipt of the CMYK image data and the developer consumption Ttc2 from the second data processor 4 and the developer consumption calculator 5, the bus controller 3 causes the CPU 7 to store the image data and the developer consumption Ttc2 in the memory 8. The CMYK image data stored in the memory 8 is sent to the plotter 10 via the CPU 7 and a plotter I/F device 9. The plotter 10 outputs the CMYK image data onto transfer paper. That is, the plotter 10 forms an image with a developer on the sheet.

The HDD 6, which is of a type used in personal computers, is a large-scale storage device for storing electronic data. The HDD 6 is mainly used for storing digital image data and data associated therewith. In the first embodiment, the HDD 6 is the one for connection via an ATA bus, which is an expansion of integrated drive electronics (IDE) and standardized. The HDD 6 can alternatively be another storage device. Examples of an employable storage device include a silicon disk that uses flash memory of which memory capacity has been increased in recent years.

The CPU 7 is a microprocessor that controls the MFP 100. In the first embodiment, an integrated CPU that is a CPU core having additional functions and that has become proliferate in recent years is employed. For example, RM 111000 manufactured by PMC-Sierra, Inc., which is a CPU to which a connecting function with a universal standard I/F and a bus connecting function using a crossbar switch are integrated, is employed as the CPU.

The memory 8 is a volatile memory that temporarily stores therein various data such as data exchanged and absorbs speed differences among various bus standards and a difference in processing speed between components connected via a bus. The memory 8 also stores therein intermediate processing data and computer programs used by the CPU 7 for controlling the digital image forming apparatus. Because fast processing is required of the CPU 7, the CPU 7 uses a boot program stored in a read only memory (ROM) 15 to activate the system at a start-up of the image forming apparatus, and thereafter performs processing using computer programs loaded into the memory 8 that is accessible at a high speed. The memory 8 can be a dual inline memory module (DIMM) that is standardized and used in personal computers.

Upon receipt of the CMYK digital image data sent via the universal standard I/F integrated in the CPU 7, the plotter I/F device 9 bridges between buses to output the digital image data to an interface for exclusive use by the plotter 10. The universal standard I/F can be a PCI Express® bus.

Upon receipt of the CMYK digital image data, the plotter 10 prints out an image represented by the CMYK image data on a transfer sheet through an electrophotographic process using a laser beam. As a matter of course, the procedure, according to which the image data is printed out, can be another procedure. Examples of an employable process include an inkjet printing method that has become proliferate for personal use.

A southbridge (SB) 14, which is one of chip sets used in personal computers, is a general-purpose electronic device. More specifically, the SB 14 is general-purpose circuit having a bridging function between buses often used in building a CPU system that typically includes a PCI Express® bus and an industry standard architecture (ISA) bus. The SB 14 bridges between the CPU 7 and the ROM 15. The ROM 15 stores therein computer programs (including a boot program) used by the CPU 7 to control image processing.

An display device 11 is an interface between the MFP 100 and a user, and includes a liquid crystal display (LCD) and keys, buttons, etc. The display device 11 displays various statuses, operating methods of the MFP 100, and notifications on the LCD and detects input entered by the user with a key. The display device 11 is connected to the CPU 7 via the PCI Express® bus.

The line I/F device 12 connects between the PCI Express® bus and a telephone line, and allows the MFP 100 to exchange various data via the telephone line.

An external facsimile (FAX) machine 16 is a general one that exchanges image data with the MFP 100 via the telephone line.

The external I/F device 13 connects between the PCI Express® bus and external devices, and allows the MFP 100 to exchange various data with the external devices. As a connecting I/F of the external I/F device 13, a network (Ethernet®) and a universal serial bus (USB) are used in the first embodiment. More specifically, the MFP 100 is connected to the network or an external medium (e.g., secure digital (SD) card) via the external I/F device 13 to send image data to the outside and read image data from the outside.

A PC 17 is what is called a personal computer. A user performs various control and input-and-output operations related to image data for the MFP 100 via application software and drivers installed on the PC 17.

An external medium 18 is a memory device such as a compact Flash® card and an SD card, and stores therein image data and other various electronic data. The external medium 18 allows a user to exchange (read and write) image data to and from the MFP 100 and the memory device.

Figure 5B:
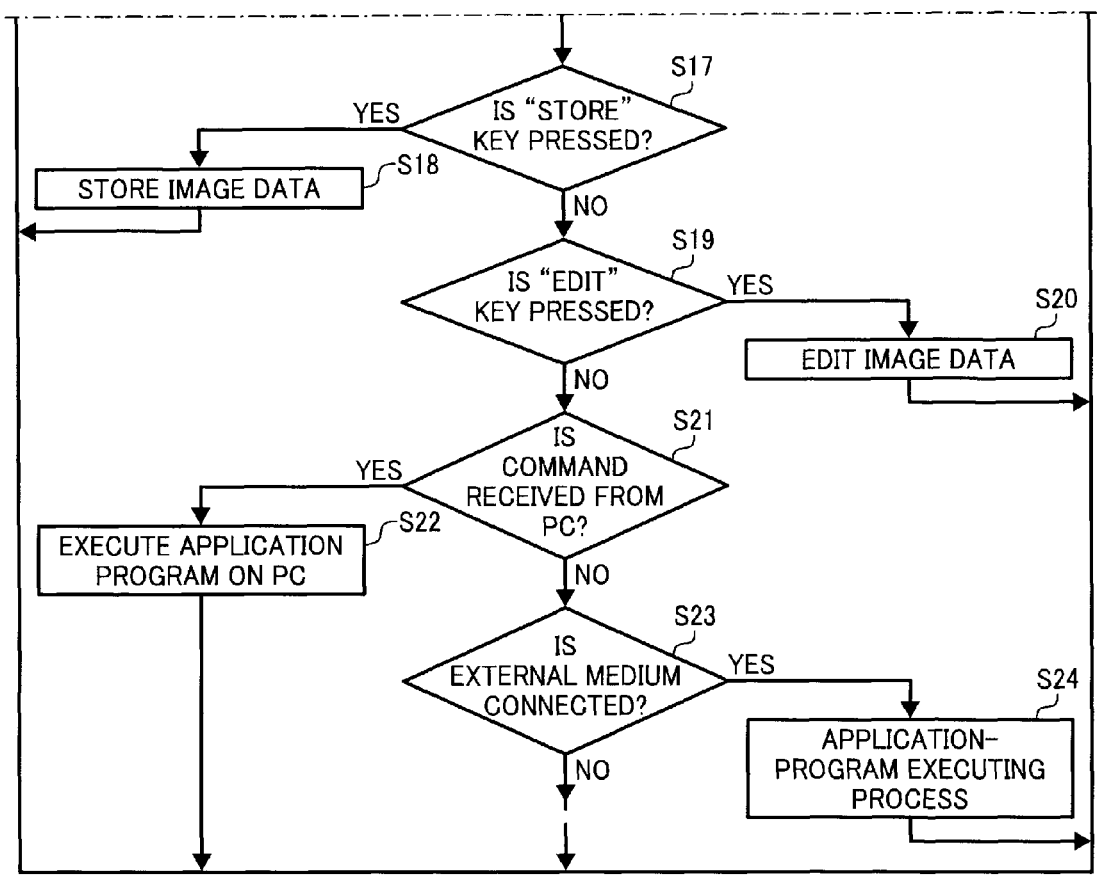
FIG. 5 is a flowchart of image processing control performed by a CPU shown in FIG. 1.

FIG. 5 is a flowchart of system control operation performed by a system controller (SCD), more specifically, the CPU 7 in the SCD, in response to a user's instruction entered on the display device 11 or a command supplied from the PC 17. When a working voltage is fed, the CPU 7 clears output ports, initializes internal memory and registers (steps S1 and S2), and reads a status of each unit (step S3). Upon detection of an error (step S4), the CPU 7 indicates a notification of an error on the LCD of the display device 11 or with a light-emitting diode (LED), and waits for the condition to turn into a normal condition (step S5). When the MFP 100 is in a normal condition, the CPU 7 waits for an instruction to be entered by a user on the display device 11, a command from the PC 17, or a request for receipt from the FAX machine 16 at input reading (step S6).

Meanwhile, when an "initial setting" key on the display device 11 is pressed, the display device 11 (more specifically, the CPU 7 in the display device 11) performs initial setting process (step S8). At the initial setting process (step S8), the display device 11 displays on the LCD a menu for initial settings. The menu includes a user registration field. When the user registration field is selected, a password entry screen for administrator access appears. When a user enters an administrator password, the display device 11 displays an entry screen for user registration. By entering a user name and a password on the entry screen, user registration is performed. The data entered for the user registration (i.e., user name and password) is written to non-volatile memory of the display device 11.

When a user presses a "copy" key (step S9), which is a key among a function-selection key group displayed on the LCD of the operation display device 11, an entry screen for a copying mode appears on the LCD, and the CPU 7 in the system controller SCD performs copying process (step S10) according to input related to copying entered by the user on the display device 11.

When a user presses a "scan" key among the function-selection key group (step S11), an entry screen for image scanning mode appears on the LCD, and the CPU 7 performs scanning process (step S12) according to input related to scanning entered by the user on the display device 11. When the user presses a "print" key among the function-selection key group (step S13), an entry screen for a stored-image printing mode appears on the LCD, and the CPU 7 performs printing process (step S14) according to input related to stored-image printing entered by the user on the display device 11. When the user presses a "facsimile" key among the function-selection key group (step S15), an entry screen for a facsimile transmission mode for faxing an original read by the scanner 1 appears on the LCD, and the CPU 7 performs facsimile transmission process (step S16) according to input related to facsimile transmission entered by the user on the display device 11. When the user presses a "store" key among the function-selection key group (step S17), an entry screen for storing (registering) mode for storing image data of an original read by the scanner 1 appears on the LCD, and the CPU 7 stores the image data (step S18) according to input related to storing entered by the user on the display device 11. When the user presses an "edit" key among the function-selection key group (step S19), an entry screen for reading image data stored in the HDD 6 and editing the image data appears on the LCD, and the CPU 7 edits the image data (step S20) according to input related to editing entered by the user on the display device 11.

An application program is installed on the PC 17 connected to the MFP 100. The application program allows the use of the PC 17 as an equivalent of the display device 11 and displays a scanned image on a display screen connected to the PC 17 in the same manner as on the display screen of the display device 11. Thus, a user can operate the MFP 100 on the PC 17 as on the display device 11. When the application program of the PC 17 is started, the LCD displays a control-panel entry screen similar to that displayed on the display device 11. When a cursor is moved to an input button on the entry screen and double-clicked or an enter key is pressed, the PC 17 recognizes that the input button is activated. When the system controller SCD in the MFP 100 receives a command supplied from the PC 17 in response to activation of an input button on the PC 17 (step S21), the CPU 7 in the system controller SCD starts a control operation according to the command as in the case in which an input button is pressed on the display device 11 (step S22).

In a state in which the external medium 18 such as memory is connected to the external I/F device 13 (step S23), the LCD displays an entry screen for reading and writing data from and to the external medium 18. The CPU 7 performs application-program executing process for external medium (step S24) according to input related to reading and writing from and to the external medium 18 entered by the user on the display device 11.

FIG. 6 is a detailed flowchart of the copying process (from scanner input to output with plotter) shown in FIG. 5 (step S10). When the process control proceeds to the copying process, the CPU 7 displays an entry screen for copying on the LCD of the display device 11 (step S31). A user places an original on an exposure glass of the scanner 1 or an automatic document feeder (ADF) (not shown), and enters settings about a desired copying mode and the like and an instruction to start copying on the display device 11. The display device 11 converts information on the copying mode, the starting instruction, and the like entered by the user into internal control command data, and issues the control command data. The issued control command data is sent to the CPU 7 via the PCI Express® bus (steps S32 and S33).

The CPU 7 causes the scanner 1 to scan the original to obtain 8-bit RGB digital image data. The 8-bit RGB digital image data is corrected by the first data processor 2 to bear predetermined characteristics and sent to the bus controller 3. The bus controller 3 writes the image data corrected by the first data processor 2 to the memory 8 (step S34). The average developer consumption retained by the nonvolatile storage is multiplied by a sheet count of the scanned original. A result of the multiplication is an estimated developer consumption $Ttc1$, which is an estimated amount of the developer required by the plotter 10 to complete printing of the scanned image data (step S35). The calculation is performed by a first calculator of the first embodiment.

Meanwhile, the average developer consumption is calculated for each of four colors: Y, M, C, and Bk. The estimated developer consumption Ttc1 is calculated for each of four colors: Y, M, C, and Bk as well. Although calculation of the developer remaining amount, detection of shortage of developer, and the like processes are performed for each of color materials, each process is described below as to only one of the color materials. However, it should be noted that each process is carried out for each of the color materials Y, M, C, and Bk in practice.

Whether the estimated developer consumption Ttc1 is greater than the developer remaining amount Rt retained by the nonvolatile storage of the CPU 7 is determined (step S36). When printing of an image is started in this state in which the estimated developer consumption Ttc1 is greater than the developer remaining amount Rt, it is highly likely that the developer container becomes empty before the printing is completed. Accordingly, an instruction to suppress a total consumption of the developer so that the printing can be completed is issued to the second data processor 4 (step S37).

More specifically, an interrupt job, such as copying and printing, that uses the plotter 10 is disabled first. A developer shortage ratio Ptcr for the current copying job is then calculated as follows (step S38):

$$Ptcr=[(Ttcq-Rt)/Ttc1]\times 100(\%).$$

Subsequently, the developer shortage ratio Ptcr is converted into a developer reduction ratio for each unit in the second data processor 4 using a shortage-ratio/reduction-ratio conversion table (LUT), and set to each unit (step S39). Each unit performs a process for reducing a developer consumption by an amount corresponding to the reduction ratio. For example, when it is estimated that the printing can be completed by reducing by half the developer consumption, the developer consumption is reduced by half. Because a plurality of methods for suppressing the developer consumption are provided as described later, the shortage-ratio/reduction-ratio conversion table (LUT) includes information for determining combinations, priorities, and values of reduction ratios to be assigned to each unit in the second data processor 4 according to a given shortage ratio Ptcr. Thus, a reduction ratio to be assigned to each unit is read from the conversion table (LUT) by applying the given shortage ratio Ptcr thereto. According to data for conversion included in the shortage-ratio/reduction-ratio conversion table (LUT), for example, a procedure is branched as follows. When the developer shortage ratio Ptcr is equal to or smaller than 50%, combining image is performed. When the developer shortage ratio Ptcr is greater than 50%, pixel density values are decreased. When further suppression of the developer consumption is required, thinning is performed. If a printing job is interrupted by another printing job, estimation of a developer consumption fails. Therefore, as described above, interruption by another job is disabled until the current printing (copying) job is completed (step S38). When the developer shortage ratio Ptcr is greater than a threshold value Crd for determination of developer-container replacement time, a notification "replace developer container" for replacement of the container, appears on the LCD of the display device 11 (steps S40 and S41).

However, even when the current printing job can be completed, it is likely that the developer consumption needs to be suppressed by such a large extent as to make it difficult for a user to read information represented by the image. Accordingly, when the developer shortage ratio Ptcr exceeds an image-degradation threshold value Cre, which is greater than the threshold value Crd, a caution "poor print quality" indicating that an image quality of a print will be poor is additionally displayed on the LCD of the display device 11 (steps S42 and S44). Subsequently, considering that the user can shut down a main power of the MFP 100 for replacement of the developer container, the CPU 7 saves (stores) the image data on the scanned image and the estimated developer consumption Ttc1, which are retained by the memory 8, in the HDD 6 (step S43). When the main power is turned off and thereafter turned on, the CPU 7 indicates on the LCD of the display device 11 that the printing job remains uncompleted. Upon receipt of an instruction to start the job, the CPU 7 resumes the printing control procedure from step S36 and starts printing of the image data saved in the HDD 6. When an instruction to start printing is entered without shutdown of the main power even when "poor print quality" is displayed, the CPU 7 causes the procedure to proceed to the printing (step S45).

Each of the threshold values Crd and Cre is a value of the developer reduction ratio at which replacement of the developer is prompted, and can be set as desired by a user at the initial setting (step S8). The values related to conversion in the shortage-ratio/reduction-ratio conversion table (LUT) can also be adjusted by the user at the initial setting (step S8).

The CPU 7 executes a computer program for copying at the printing (step S46), and sends the image data in the memory 8 (or in the HDD 6) to the second data processor 4 using the bus controller 3. Upon receipt of the RGB image data, the second data processor 4 converts the RGB image data into CMYK image data for printing with the plotter 10, and outputs the CMYK image data to the plotter 10 via the bus controller 3. The developer consumption calculator 5 counts density values of pixels of the CMYK image data supplied from the second data processor 4 and estimates the developer consumption Ttc2, which is an amount of toner to be used in an electrophotographic process. The developer consumption Ttc2 is subtracted from the current developer remaining amount Rt, and the developer remaining amount Rt is updated to a value obtained as a result of the subtraction (step S46). The CMYK image data supplied from the second data processor 4 for printing with the plotter 10 is output to the plotter 10. The developer consumption Ttc2 is saved as control information for determining a reduction ratio of the developer when the image data is output for reuse.

Figure 7:
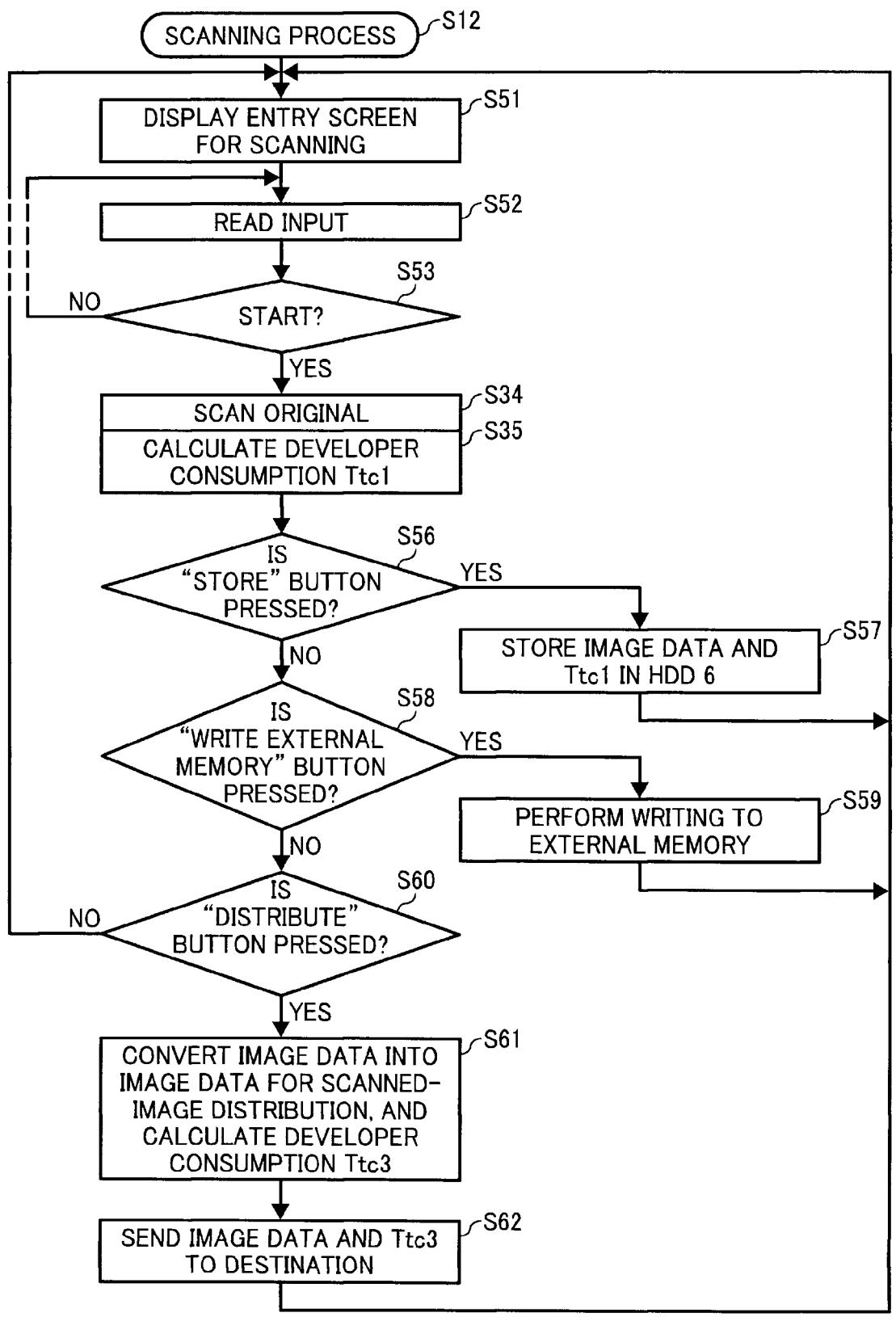
FIG. 7 is a detailed flowchart of a scanning process shown in FIG. 5.

FIG. 7 is a detailed flowchart of the scanning process (from scanner input to distribution) shown in FIG. 5 (step S12). When the procedure proceeds to the scanning process, the CPU 7 displays an entry screen for scanning on the LCD of the display device 11 (step S51). A user places an original on the exposure glass or the ADF of the scanner 1, and enters settings about a desired scanning mode and the like and an instruction to start scanning on the display device 11. The display device 11 converts data on the scanning mode and like, and the instruction to start scanning entered by the user into internal control command data, and issues the control command data. The control command data is sent to the CPU 7 via the PCT Express® bus (steps S52 and S53).

The CPU 7 causes the scanner 1 to scan the original to obtain 8-bit RGB digital image data. The 8-bit RGB digital image data is corrected by the first data processor 2 to bear predetermined characteristics and sent to the bus controller 3. The bus controller 3 writes the image data corrected by the first data processor 2 on the memory 8 (step S34). The average developer consumption retained by the nonvolatile storage is multiplied by a sheet count of the scanned original. The result of the multiplication is an estimated developer consumption Ttc1, which is an estimated amount of the developer required by the plotter 10 to complete printing of the scanned image data (step S35).

The CPU 7 displays "store", "write external memory", and "distribute" as input buttons on the display device 11 to prompt a user to enter a subsequent job. When the user presses the "store" button (step S56), a file for storing target data therein is stored in the HDD 6 according to an instruction entered by the user, and the scanned image data and the estimated developer consumption Ttc1 are written to the file (step S57). The stored image data can be edited or modified by specifying the image file on the display device 11 and displaying the image data on the LCD of the display device 11. The stored image data can also be printed out with the plotter 10, transferred to the PC 17 or the external medium (SD card) 18, or faxed. When the user presses the "write external memory" button (step S58), the image data and the estimated developer consumption Ttc1 in the memory 8, or, when specified by the user, a set of image data in the memory 8 converted into a standard color space specified by the user and the estimated developer consumption Ttc1 are written to the external medium 18 via the external I/F device 13 (step S59).

When the user presses the "distribute" button (step S60), the RGB image data stored in the memory 8 is sent to the second data processor 4 via the bus controller 3. The second data processor 4 converts the RGB image data into image data for scanned-image distribution (multi-valued RGB, grayscale, binary monochrome, or the like) (step S61), and outputs the converted image data (step S62).

Specifically, the filtering unit 401 of the second data processor 4 corrects sharpness of the RGB image data so that the scanned RGB image data exhibits good reproducibility when distributed. More specifically, the filtering unit 401 sharpens and smoothes the RGB image data according to data on a desired mode. For example, in the character mode, the filtering unit 401 sharpens the image data to clarify and emphasize characters, whereas in the photo mode, the filtering unit 401 smoothes the image data to smoothly represent grayscale tones. Upon receipt of the 8-bit RGB image data, the color converter 402 converts the image data to a specified color space. Specifically, the color converter 402 converts the RGB image data to the sRGB color space, which is generally used in scanned-image distribution, with 8 bits for each color. The resolution converter 403 converts a resolution of the sRGB image data into a resolution for data exchange in specified scanned-image distribution. In the first embodiment, the resolution is 200 dpi (main scanning direction)×200 dpi (sub-scanning direction). The γ converter 404 generally γ-corrects the RGB image data so that the scanned RGB image data exhibits good reproducibility when distributed. However, because the image data is already color-matched to the sRGB color space, no γ conversion is performed at this stage. The halftone processor 405 generally performs halftone processing according to a halftone processing capacity for data exchange in a specified scanned-image distribution. In the first embodiment, when 160,000 colors, i.e., eight bits for each color of the RGB, are specified as the capacity, no tone processing is performed. The developer consumption calculator 5 counts density values of pixels of the image data processed by the second data processor 4 and calculates a developer consumption Ttc3, which is an amount of toner to be consumed in the electrophotographic process (step S61). The image data and the developer consumption Ttc3 converted by the second data processor 4 are stored in the memory 8 via the bus controller 3. The image data and the developer consumption Ttc3 stored in the memory 8 are sent to the external I/F device 13 via the CPU 7. Upon receipt of the image data, the external I/F device 13 sends the image data to the PC 17 via the network (step S62).

Figure 8A:
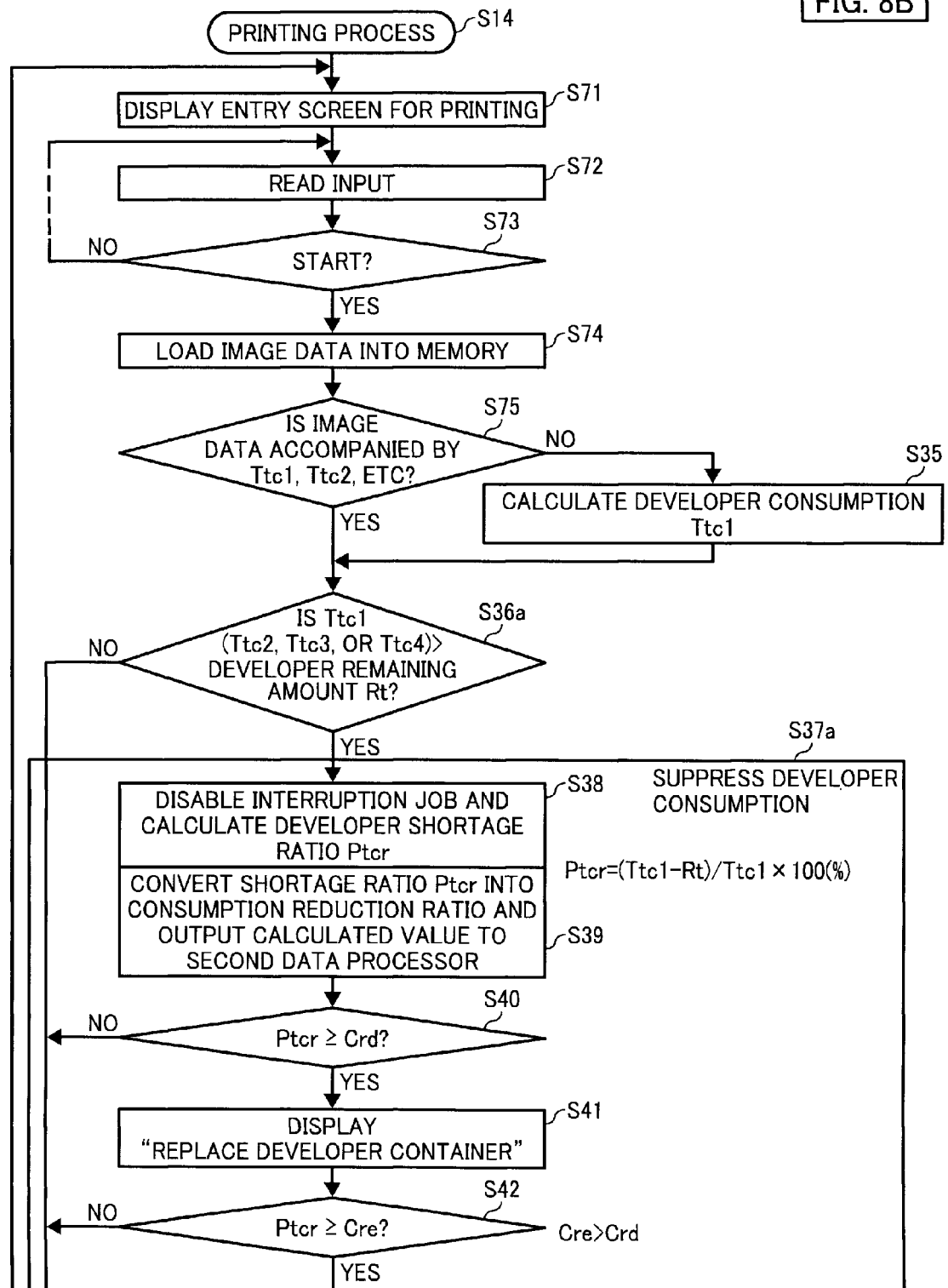
FIG. 8 is a detailed flowchart of a printing process shown in FIG. 5.
Figure 8B:
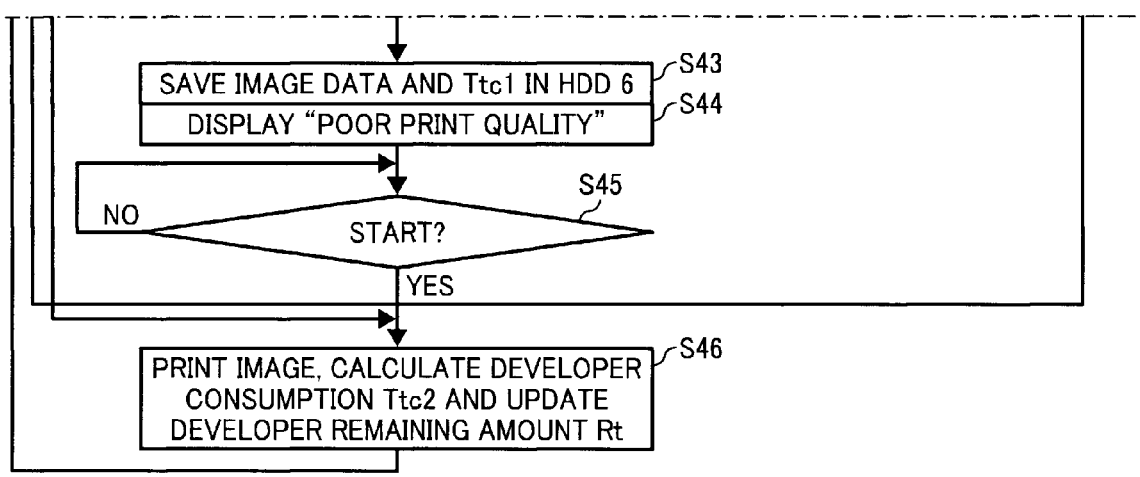

Described below is the printing process of image data stored in the PC 17, the FAX machine 16, the HDD 6, or the external medium 18 with a plotter. FIG. 8 is a detailed flowchart of the printing process shown in FIG. 5 (step S14). When the procedure proceeds to the printing process, the CPU 7 displays an entry screen for printing on the LCD of the display device 11 (step S71). A user specifies a directory that contains a desired image file and a name of the image file, and a print mode, then enters an instruction to start printing. The display device 11 converts information on the directory (under which the target image data is input), the image file name, the print mode, and the like into internal control command data, and issues the control command data. The issued control command data is sent to the CPU 7 via the PCI Express® bus (steps S72 and S73). The CPU 7 saves (loads) the image data in the image file in the memory 8 (step S74).

When a request for printing of image data is sent from the PC 17 or when a request for receiving and printing of image data is sent from the FAX machine 16, the CPU 7 receives the requested image data and then converts the image data into image data without performing operations related to steps S71 to S73, and the CPU 7 saves (loads) the image data in the memory 8 (step S74).

When the image data loaded in the memory 8 is not accompanied by the developer consumption Ttc1 (Ttc2, Ttc3, or Ttc4), the CPU 7 multiplies a print sheet count, which is entered as a print job, by a per-page average developer consumption, thereby obtaining the developer consumption Ttc1, which is a cumulative amount of the developer estimated to be consumed in the current job (step S35).

The CPU 7 determines whether the developer consumption Ttc1 (Ttc2, Ttc3, or Ttc4) is greater than the developer remaining amount Rt retained by the nonvolatile storage of the CPU 7 (step S36a). When printing of the image is started in this state in which the developer consumption Ttc1 is greater than the developer remaining amount Rt, the developer container highly possibly becomes empty before the printing is completed. Accordingly, an instruction to suppress a total consumption of the developer so that the printing can be completed is issued to the second data processor 4 (step S37a). Operations to be performed at step S37a are similar to those performed at step S37 in FIG. 6. When the image data loaded in the memory 8 is accompanied by the developer consumption Ttc2, Ttc3, or Ttc4 rather than the developer consumption Ttc1, the operations are performed at step S37a for the developer consumption Ttc2, Ttc3, or Ttc4 similarly for the developer consumption Ttc1 as described above.

The image data in the memory 8 is digital image data based on a standardized color space or incoming fax data. Among variously-defined standardized color spaces, sRGB or Adobe® RGB is generally used. If the image data in the memory 8 uses a color space other than the standardized color spaces, the image data saved in the memory 8 is sent to the first data processor 2 via the CPU 7 and the bus controller 3, converted into a standardized color space specified by a user, and saved in the memory 8 again.

The standardized-color-space image data stored in the memory 8 is sent to the second data processor 4 via the CPU 7 and the bus controller 3. The second data processor 4 receives the standardized-color-space image data and converts it into CMYK image data for printing with the plotter 10, and outputs the CMYK image data.

The developer consumption calculator 5 counts density values of pixels of the image data converted by the second data processor 4 and estimates the developer consumption Ttc2, which is the amount of toner to be consumed in the electrophotographic process. The CMYK image data is output to the plotter 10. The developer consumption Ttc2 is subtracted from the current developer remaining amount Rt. The developer remaining amount Rt is then updated to a value obtained as a result of the subtraction (step S46). The plotter 10 outputs the CMYK image data onto transfer paper.

Figure 9:
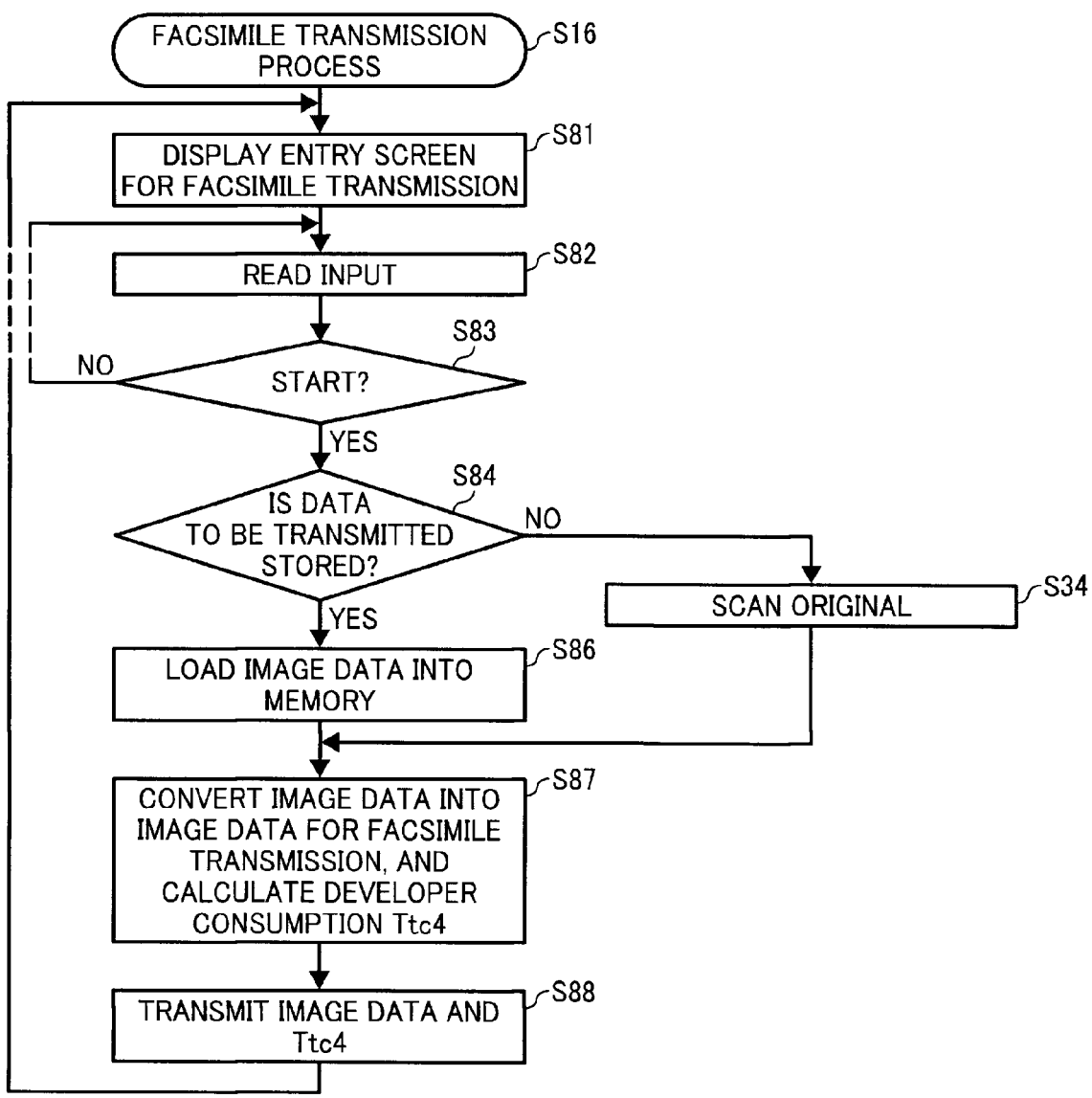
FIG. 9 is a detailed flowchart of facsimile transmission process shown in FIG. 5.

FIG. 9 is a detailed flowchart of the facsimile transmission process shown in FIG. 5 (step S16). When the process control proceeds to the facsimile transmission process, the CPU 7 displays a entry screen for facsimile transmission on the LCD of the display device 11 (step S81). The entry screen includes a field for entering a directory under which image data is to be input. When, for example, a user specifies "document", sets a document for the scanner 1, and enters "start", the CPU 7 causes the scanner 1 to scan the document to obtain 8-bit RGB digital image data (step S82 and S83). The 8-bit RGB digital image data is corrected by the first data processor 2 to bear predetermined characteristics and sent to the bus controller 3. The bus controller 3 writes the image data corrected by the first data processor 2 to the memory 8 (step S34).

The user selects the PC 17, the HDD 6, or the external medium 18 and specifies an image file therein that contains image data to be transmitted (step S84). When the user enters an instruction to start facsimile transmission, the CPU 7 loads the image data of the image file into the memory 8 (step S86).

The CPU 7 sends the image data stored in the memory 8 to the second data processor 4 via the bus controller 3. The second data processor 4 converts the received image data into binary monochrome image data for facsimile transmission. Specifically, the filtering unit 401 of the second data processor 4 corrects sharpness of the image data so that the image data exhibits good reproducibility when faxed. More specifically, the filtering unit 401 sharpens and smoothes the image data according to information on a desired mode. For example, in the character mode, the filtering unit 401 sharpens the image data to clarify and emphasize characters, whereas in the photo mode, the filtering unit 401 smoothes the image data to smoothly represent grayscale tones. Upon receipt of the 8-bit image data, the color converter 402 converts the image data to 8-bit monochrome image data that is generally employed in facsimiles. The resolution converter 403 converts a resolution of the monochrome image data into a resolution for facsimile transmission. In the first embodiment, the resolution is 200 dpi (main scanning direction)×100 dpi (sub-scanning direction). The γ converter 404 generally γ-corrects the monochrome image data so that the monochrome image data exhibits good reproducibility when faxed. For example, in the character mode, the γ converter 404 performs γ correction using a relatively high contrast value to clarify and emphasize characters. In the photo mode, the γ converter 404 performs γ correction using a relatively flat (i.e., with a slight gradient) γ-correction curve for smooth half-toning. Upon receipt of the monochrome 8-bit data, the halftone processor 405 performs halftone processing according to a halftone processing capacity used in data exchange by the facsimile. In the first embodiment, conversion into binary data according to the error diffusion method, which is one of digital halftoning methods, is performed. The developer consumption calculator 5 counts density values of black pixels (printing pixels) in the binary monochrome image data, which is converted by the second data processor 4, and calculates the developer consumption Ttc4, which is an amount of toner to be consumed in the electrophotographic process (step S87).

The CPU 7 stores the binary monochrome image data converted by the second data processor 4 and the developer consumption Ttc4 in the memory 8. Thereafter, the CPU 7 transmits the binary monochrome image data and the developer consumption Ttc4 stored in the memory 8 to the FAX machine 16 via the line I/F device 12.

Figure 10:
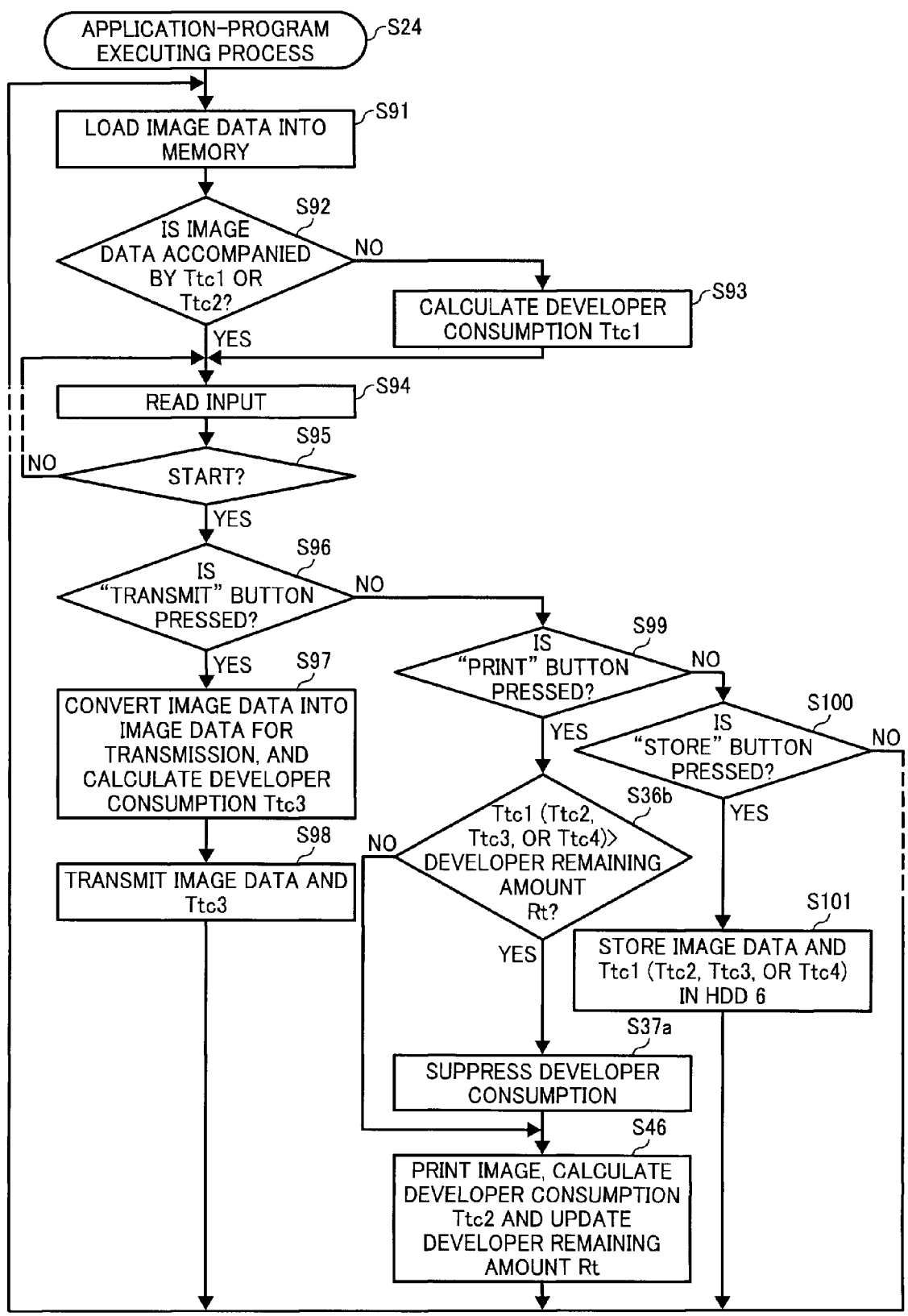
FIG. 10 is a detailed flowchart of application-program executing process in external memory shown in FIG. 5.

Described below is the application-program executing process for external memory (utilizing image data in an external medium). FIG. 10 is a detailed flowchart of the application-program executing process shown in FIG. 5 (step S24). When a user presses the "external memory" button on the display device 11, the CPU 7 displays a list of data files in the external medium 18. When the user selects a file from the list and enters "open", data of the file contained in the external medium 18 and selected by the user is loaded into the memory 8 (step S91). When the data is not image data, the data is converted into image data and then loaded into the memory 8. When the image data loaded into the memory 8 is not accompanied by the developer consumption Ttc1 (Ttc2, Ttc3, or Ttc4), the CPU 7 multiplies a sheet count (the number of pages) of the image by the per-page average developer consumption, thereby obtaining the developer consumption Ttc1, which is a cumulative amount of the developer estimated to be consumed in the current job (step S93). The CPU 7 then displays entry fields for specifying "transmit", "print", "store", "edit", "modify", or a like job on the display device 11.

When the user presses the "transmit" button and enters "start", the CPU 7 sends the image data in the memory 8 to the second data processor 4 via the bus controller 3 (steps S94, S95 and S96). The second data processor 4 receives the image data and converts it into image data for scanned-image distribution (multi-valued RGB, grayscale, binary monochrome, or the like), and outputs the converted image data. The developer consumption calculator 5 counts density values of pixels of the image data processed by the second data processor 4 and calculates the developer consumption Ttc3, which is an amount of toner to be consumed in the electrophotographic process (step S97). The image data and the developer consumption Ttc3 converted by the second data processor 4 are stored in the memory 8 via the bus controller 3. The image data and the developer consumption Ttc3 stored in the memory 8 are sent to the external I/F device 13 via the CPU 7. The external I/F device 13 receives the image data and sends it to the PC 17 connected to the external I/F device 13 via the network (step S98).

When the user presses the "print" button and enters "start" (step S99), the CPU 7 determines whether the developer consumption Ttc1 (Ttc2, Ttc3, or Ttc4) is greater than the developer remaining amount Rt retained by the nonvolatile storage of the CPU 7 (step S36b). When printing of an image is started in this state in which the developer consumption Ttc1 is greater than the developer remaining amount Rt, it is highly likely that the developer container becomes empty before the printing is completed. Accordingly, an instruction to reduce a total consumption of the developer so that the printing can be completed is issued to the second data processor 4 (step S37a). The operations to be performed at step S37a are similar to those performed at step S37 in FIG. 6 described above. When the image data loaded into the memory 8 is accompanied by the developer consumption Ttc2, Ttc3, or Ttc4 rather than the developer consumption Ttc1, the operations are performed at step S37a for the developer consumption Ttc2, Ttc3, or Ttc4 similarly for the developer consumption Ttc1 as described above. The standardized-color-space image data stored in the memory 8 is sent to the second data processor 4 via the CPU 7 and the bus controller 3. The second data processor 4 receives the standardized-color-space image data and converts the image data into CMYK image data for printing with the plotter 10, and outputs the CMYK image data. The developer consumption calculator 5 counts density values of pixels of the image data converted by the second data processor 4 and estimates the developer consumption Ttc2, which is the amount of toner to be consumed in the electrophotographic process. The CMYK image data is output to the plotter 10. The developer remaining amount Rt is updated to a value obtained by subtracting the estimated developer consumption Ttc2 from the current developer remaining amount Rt. The plotter 10 receives the CMYK image data and output it on transfer paper (step S46).

When the user presses the "store" button and enters "start", the user enters an image file to be stored in the HDD 6. The CPU 7 writes to the image file the image data and the developer consumption Ttc1 (Ttc2, or the like) loaded in the memory 8 (steps S100 and S101).

Figure 11:
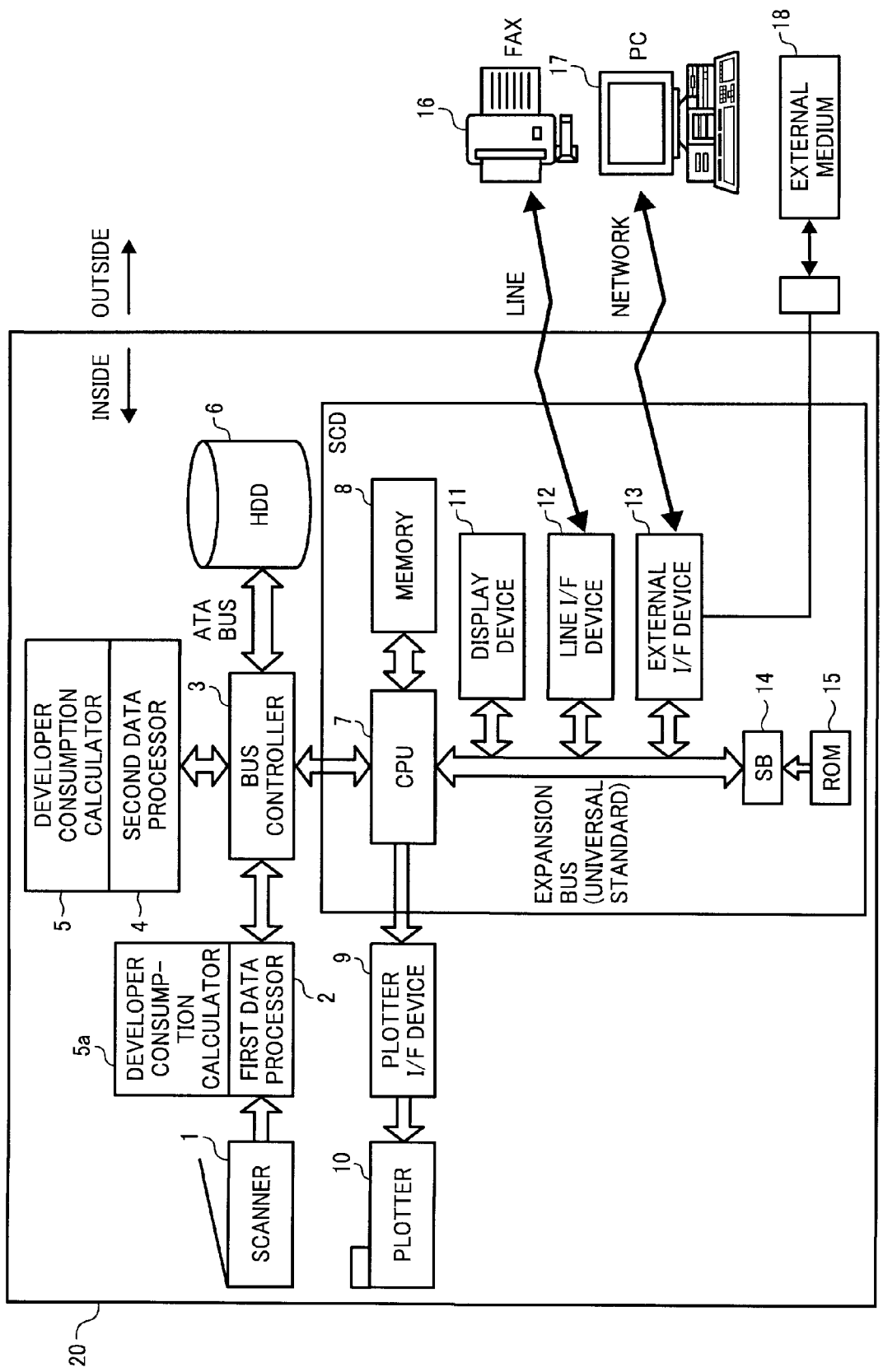
FIG. 11 is a block diagram of an image forming apparatus according to a second embodiment of the present invention.
Figure 12:
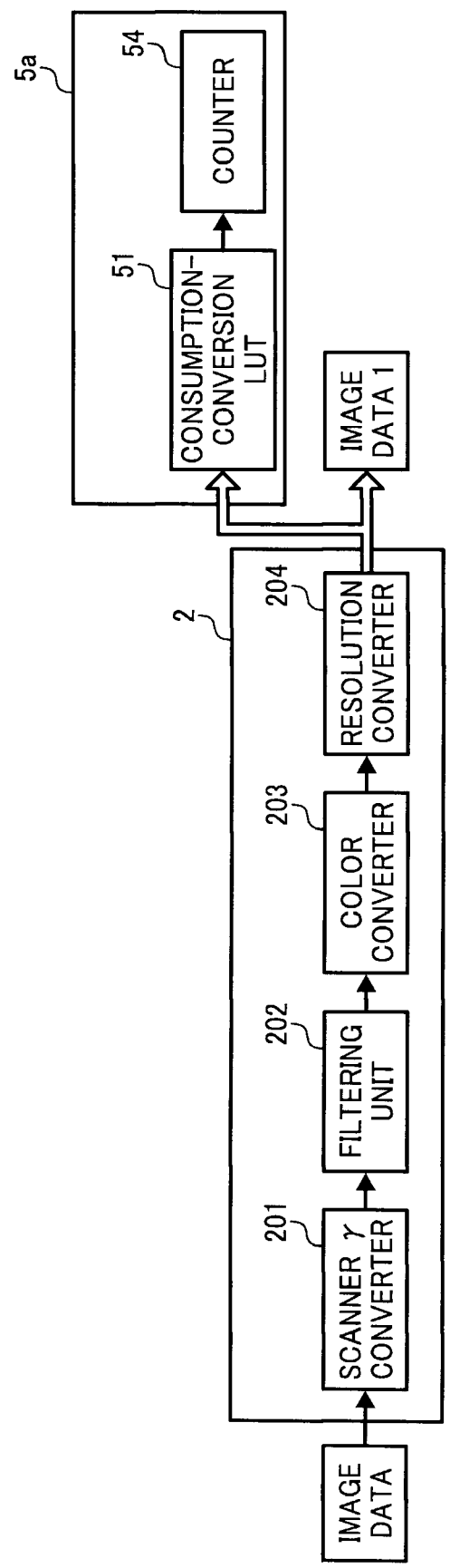
FIG. 12 is a functional block diagram of a first image processor and a developer consumption calculator shown in FIG. 11.

FIG. 11 is a block diagram of an MFP 20 according to a second embodiment of the invention. The MFP 20 is basically similar to the MFP 100 of the first embodiment except that it further includes a developer consumption calculator 5a at a subsequent stage of the first data processor 2. FIG. 12 is a block diagram of the first data processor 2 and the developer consumption calculator 5a. A consumption conversion LUT 53 in the developer consumption calculator 5a maps higher order bits (data to be lowered in gray level) of each RGB image data set to density values of yellow, magenta, cyan, and black (YMCBk), respectively, and outputs density values of YMCBk associated with given RGB image data. A counter 54 counts image density values of density data for each color of YMCBk and calculates the developer consumption (estimated developer consumption) Ttc1 for each color of YMCBk. In the first embodiment (FIG. 1), the developer consumption Ttc1 is estimated by multiplying the per-page average developer consumption by the sheet count of the image to be printed. By contrast, in the second embodiment, the developer consumption Ttc1 is estimated based on the RGB image data corrected by the first data processor 2. That is, the developer consumption Ttc1 is estimated based on the RGB image data rather than CMYK image data, which is image data for colors actually used in printing. Therefore, in spite of low accuracy in estimation, the developer consumption Ttc1 is calculated with a smaller error than that calculated according to the first embodiment, in which the developer consumption Ttc1 is calculated based on the per-page average developer consumption derived from past developer consumptions.

Figure 13:
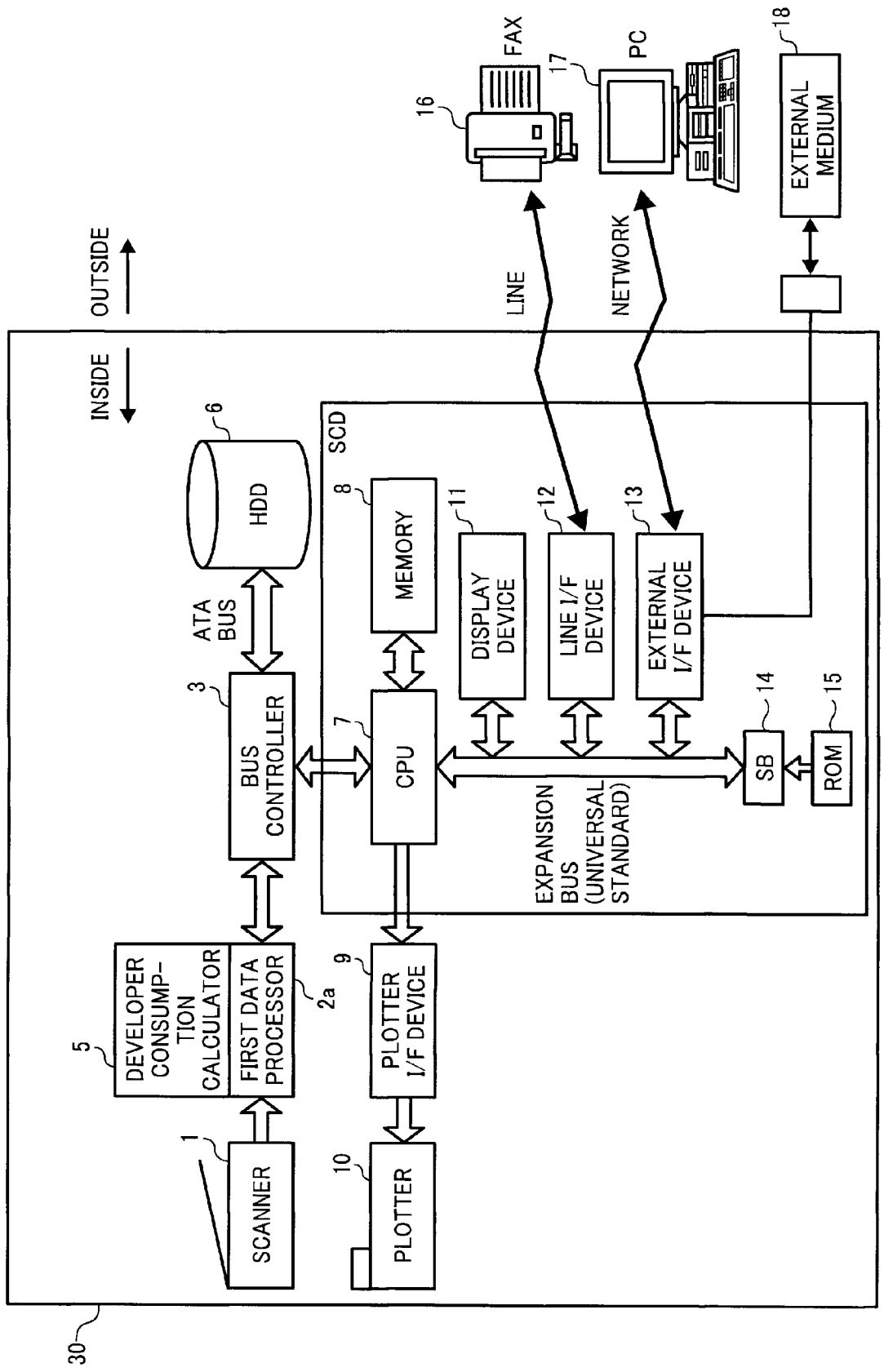
FIG. 13 is a block diagram of an image forming apparatus according to a third embodiment of the present invention.
Figure 14:
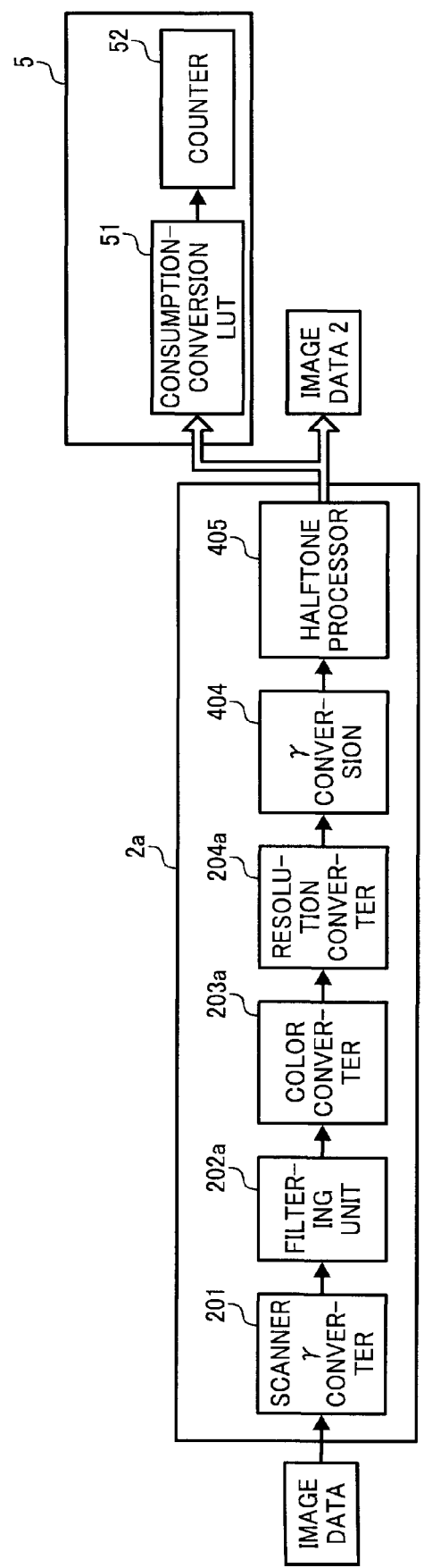
FIG. 14 is a functional block diagram of a first image processor and a developer consumption calculator shown in FIG. 13.

FIG. 13 is a block diagram of an image forming system of an MFP 30 according to a third embodiment of the present invention. The MFP 30 is basically similar to the MFP 100 of the first embodiment except that the MFP 3 does not include the second data processor 4 and includes a first data processor 2a instead. As shown in FIG. 14, the first data processor 2a also has the function of the second data processor 4. The first data processor 2a provides functions of both filtering of scanned image data and filtering for printing, and also functions as both a color converter 203a and a resolution converter 204a as well. For calculation of the developer consumption Ttc1, the CPU 7 of the third embodiment sets the first data processor 2a to an image processing mode in which a scanned image is printed without suppressing the developer consumption. The developer consumption calculator 5 calculates the developer consumption Ttc1 for each of YMCBk colors based on YMCBk image data converted by the first data processor 2a. The scanned image data is stored in the memory 8. Processes subsequent thereto are performed as in the first embodiment. More specifically, the developer consumption Ttc1 is compared with the developer remaining amount Rt.

When the developer is estimated to fall short, the first data processor 2a is instructed to perform consumption reduction (step S37, S37a), and the image data in the memory 8 is converted into YMCBk image and then printed with the plotter 10. During the course of the processes, the developer consumption calculator 5 calculates the developer consumption Ttc2 for each of YMCBk colors. The CPU 7 subtracts the developer consumption Ttc2 from the developer remaining amount Rt, and updates the developer remaining amount Rt to the calculated value.

As described above, according to the third embodiment, the developer consumption Ttc1, which is a value used to determine whether developer suppression is necessary, is calculated by the developer consumption calculator 5 based on the YMCBk image data, allowing to calculate the developer consumption Ttc1 with high accuracy. Thus, highly reliable developer reduction is attained.

In the embodiments described above, the developer remaining amount Rt is calculated using the cumulative developer consumption and the initial remaining amount in the developer container. Alternatively, the remaining amount Rt can be detected with a sensor intermittently or at certain stages, and the remaining amount is updated to the detected value. That is, the value detected with the sensor is set to an initial value. When the sensor is capable of detecting the remaining amount constantly and precisely, a value of the remaining amount detected with the sensor can be used as the developer remaining amount Rt, thereby omitting calculation of the developer consumption Ttc2.

As described above, according to an embodiment of the present invention, it is possible to remove the need of replacing a developer container during a course of an image-forming job, and assure printing even when the remaining-developer level is low. Thus, a decrease in productivity is prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a scanning unit that reads image data and outputs read image data;
   a data-processing unit that converts the read image data into print image data;
   an output unit that forms an image on a recording medium with developer based on the print image data, and outputs the image;
   a first calculating unit that calculates estimated developer consumption, which is an amount of developer that the output unit requires to complete forming an image corresponding to the read image data;
   a second calculating unit that calculates developer consumption, which is an amount of developer corresponding to a sum of density values of pixels of the image to be formed by the output unit based on the print image data;
   an updating unit that subtracts the developer consumption from a remaining developer amount in the output unit to update the remaining developer amount for each job, and retains the remaining developer amount; and
   an instructing unit that, when the estimated developer consumption exceeds the remaining developer amount previously retained by the updating unit upon forming of the image corresponding to the read image data, issues an instruction to the data-processing unit to reduce developer to be consumed to form the image to the remaining developer amount, wherein the data-processing unit converts the read image data into the print image data in response to the instruction from the instructing unit such that the output unit forms the image with developer in the remaining developer amount, and the first calculating unit calculates, as the estimated developer consumption, a product of (i) a per-page average developer consumption that is based on past developer consumptions and (ii) number of recording media required for outputting the image corresponding to the read image data, and wherein the instructing unit disables, upon forming of the image, an interrupt job for forming another image when the estimated developer consumption exceeds the remaining developer amount.

2. The image forming apparatus according to claim 1 further comprising a storage unit that stores therein the read image data and the estimated developer consumption, wherein the instructing unit issues the instruction to the data-processing unit when the estimated developer consumption read from the storage unit exceeds the remaining developer amount retained by the updating unit.

3. The image forming apparatus according to claim 1, wherein the data-processing unit converts the read image data into image data for distribution, the second calculating unit calculates estimated developer consumption, which is an amount of developer corresponding to a sum of density values of pixels of an image to be formed by the output unit based on the image data for distribution, and the image forming apparatus further comprises: a transmitting unit that transmits the image data for distribution and the estimated developer consumption to an external device.

4. The image forming apparatus according to claim 3, further comprising a receiving unit that receives the image data for distribution and the estimated developer consumption from the external device, wherein the instructing unit issues an instruction to the data-processing unit to reduce developer to be consumed to form an image corresponding to the image data for distribution to the remaining developer amount when received estimated developer consumption exceeds the remaining developer amount.

5. The image forming apparatus according to claim 4, wherein when the image data is not accompanied by data on the estimated developer consumption, the first calculating unit calculates the estimated developer consumption, which is an amount of developer that the output unit requires to complete forming an image corresponding to the image data.

6. The image forming apparatus according to claim 3, further comprising wherein the external device includes an external memory, the image forming apparatus further comprises a reading unit that reads image data and estimated developer consumption from external memory, and the instructing unit issues an instruction to the data-processing unit to reduce developer to be consumed to form an image corresponding to the image data read from the external memory to the remaining developer amount when the estimated developer consumption read from the external memory exceeds the remaining developer amount.

7. The image forming apparatus according to claim 6, wherein when the image data is not accompanied by data on the estimated developer consumption, the first calculating unit calculates the estimated developer consumption, which is an amount of developer that the output unit requires to complete forming an image corresponding to the image data.

8. The image forming apparatus according to claim 1, wherein the data-processing unit converts the read image data into image data for facsimile transmission, the second calculating unit that calculates estimated developer consumption, which is an amount of developer corresponding to a sum of density values of pixels of an image to be formed by the output unit based on the image data for facsimile transmission, and the image forming apparatus further comprises a transmitting unit that transmits via facsimile the image data for facsimile transmission and the estimated developer consumption.

9. The image forming apparatus according to claim 8, further comprising receiving unit that receives the image data for facsimile transmission and the estimated developer consumption, wherein the instructing unit issues an instruction to the data-processing unit to reduce developer to be consumed to form an image corresponding to the image data for facsimile transmission to the remaining developer amount when received estimated developer consumption exceeds the remaining developer amount.

10. The image forming apparatus according to claim 9, wherein when the image data is not accompanied by data on the estimated developer consumption, the first calculating unit calculates the estimated developer consumption, which is an amount of developer that the output unit requires to complete forming an image corresponding to the image data.

11. The image forming apparatus according to claim 1, wherein the instructing unit calculates, upon forming of the image, a per-page developer shortage ratio based on the estimated developer consumption and the developer remaining amount, and issues an instruction to the data-processing unit to reduce developer to be consumed to form the image such that the output unit forms the image with developer corresponding to the per-page developer shortage ratio when the estimated developer consumption exceeds the remaining developer amount, and notifies that a developer container needs replacement when the per-page developer shortage ratio is equal to or greater than a first set value.

12. The image forming apparatus according to claim 11, wherein when the per-page developer shortage ratio is equal to or greater than a second set value, which is greater than the first set value, the instructing unit issues an alarm and starts forming the image after receipt of an instruction to form the image.

13. The image forming apparatus according claim 1, wherein the data-processing unit reduces the density values of pixels in response to the instruction from the instructing unit.

14. The image forming apparatus according to claim 1, wherein the data-processing unit reduces a size of the image to be formed in response to the instruction from the instructing unit.

15. The image forming apparatus according to claim 1, wherein the data-processing unit performs image combination in response to the instruction from the instructing unit.

16. The image forming apparatus according to claim 1, wherein the data-processing unit performs pixel thinning in response to the instruction from the instructing unit.

17. An image forming apparatus comprising:
a scanning unit that reads image data and outputs read image data;
a data processing unit that converts the read image data into print image data;
an output unit that forms an image on a recording medium with developer based on the print image data, and outputs the image;
a first calculating unit that calculates estimated developer consumption, which is an amount of developer that the output unit requires to complete forming an image corresponding to the read image data;
a second calculating unit that calculates developer consumption, which is an amount of developer corresponding to a sum of density values of pixels of the image to be formed by the output unit based on the print image data;
an updating unit that subtracts the developer consumption from a remaining developer amount in the output unit to update the remaining developer amount for each job, and retains the remaining developer amount; and
an instructing unit that, when the estimated developer consumption exceeds the remaining developer amount previously retained by the updating unit upon forming of the image corresponding to the read image data, issues an instruction to the data-processing unit to reduce developer to be consumed to form the image to the remaining developer amount, wherein
the data-processing unit converts the read image data into the print image data in response to the instruction from the instructing unit such that the output unit forms the image with developer in the remaining developer amount, and
the first calculating unit calculates, as the estimated developer consumption, a product of (i) a per-page average developer consumption that is based on past developer consumptions and (ii) number of recording media required for outputting the image corresponding to the read image data wherein the instructing unit disables, upon forming of the image, an interrupt job for forming another image when the estimated developer consumption exceeds the remaining developer amount,
wherein the data-processing unit performs pixel thinning in response to the instruction from the instructing unit, and
wherein the data-processing unit reduces the density values of pixels, reduces a size of the image to be formed, performs image combination, and performs pixel thinning in an order of priority associated with the per-page developer shortage ratio in response to the instruction from the instructing unit.

18. An image forming apparatus comprising:
a scanning unit that reads image data and outputs read image data;
a data-processing unit that converts the read image data into print image data;
an output unit that forms an image on a recording medium with developer based on the print image data, and outputs the image;
a first calculating unit that calculates estimated developer consumption, which is an amount of developer that the output unit requires to complete forming an image corresponding to the read image data;
a second calculating unit that calculates developer consumption, which is an amount of developer corresponding to a sum of density values of pixels of the image to be formed by the output unit based on the print image data;
an updating unit that subtracts the developer consumption from a remaining developer amount in the output unit to update the remaining developer amount for each job, and retains the remaining developer amount; and
an instructing unit that, when the estimated developer consumption exceeds the remaining developer amount upon forming of the image corresponding to the read image data, issues an instruction to the data-processing it to reduce developer to be consumed to form the image to the remaining developer amount, wherein
the data-processing unit converts the read image data into the print image data in response to the instruction from the instructing unit such that the output unit forms the image with developer in the remaining developer amount, and
wherein the instructing unit disables, upon forming of the image, an interrupt job for forming another image when the estimated developer consumption exceeds the remaining developer amount.

* * * * *